United States Patent [19]

Cortis

[11] Patent Number: 5,313,388
[45] Date of Patent: May 17, 1994

[54] METHOD AND APPARATUS FOR DIAGNOSING ENGINE AND/OR VEHICLE SYSTEM FAULTS BASED ON VEHICLE OPERATING OR DRIVE SYMPTOMS

[75] Inventor: Gregory J. Cortis, Milford, Mich.

[73] Assignee: Ford Motor Company, Dearborn, Mich.

[21] Appl. No.: 61,331

[22] Filed: May 12, 1993

Related U.S. Application Data

[63] Continuation of Ser. No. 711,843, Jun. 7, 1991, abandoned.

[51] Int. Cl.⁵ .................. G01M 15/00; G06F 11/32
[52] U.S. Cl. ................ 364/424.04; 364/424.03; 364/551.01; 73/116
[58] Field of Search ............. 364/424.03, 424.04, 364/551.01, 424.01; 73/116; 371/16.1

[56] References Cited

U.S. PATENT DOCUMENTS

| | | | |
|---|---|---|---|
| 4,108,362 | 8/1978 | Trussell et al. | 235/375 |
| 4,267,569 | 5/1981 | Baumann et al. | 364/431 |
| 4,271,402 | 6/1981 | Kastura et al. | 364/424.04 |
| 4,694,408 | 9/1987 | Zaleski | 364/551 |
| 4,748,843 | 6/1988 | Schafer et al. | 364/424.04 |
| 4,757,463 | 6/1988 | Ballou et al. | 364/551 |
| 4,796,206 | 1/1989 | Boscove et al. | 364/551.01 |
| 4,839,811 | 6/1989 | Kanegae et al. | 364/424.03 |
| 4,884,056 | 11/1989 | Ishizeki | 340/453 |
| 4,906,970 | 3/1990 | Momura | 340/438 |
| 4,975,847 | 12/1990 | Abe et al. | 364/424.03 |
| 4,975,848 | 12/1990 | Abe et al. | 364/424.03 |
| 4,996,643 | 2/1991 | Sakamoto et al. | 364/424.03 |
| 5,003,479 | 3/1991 | Kobayashi et al. | 364/424.03 |
| 5,111,686 | 5/1992 | Kamiya et al. | 340/438 |

Primary Examiner—Thomas G. Black
Assistant Examiner—Tan Q. Nguyen
Attorney, Agent, or Firm—Peter Abolins; Roger L. May

[57] ABSTRACT

A method and apparatus are provided for the collection of vehicle operating data in a motor vehicle diagnosis or analysis system. One or more motor vehicle operating or drive symptoms are utilized to access a database which identifies the most appropriate cause parameters for the drive symptom or symptoms. The database correlates entered operating or drive symptoms with system problems and, more particularly, with specific system parameters which can be monitored by connection to corresponding vehicle operating data access points. The drive symptom diagnostic method and apparatus thus identify appropriate data access points to monitor, such as conductors or pins of a connector associated with an identified motor vehicle which is experiencing problems. Once the appropriate access points are identified, pertinent vehicle operating data is collected from these data access points either when the vehicle is being serviced, as at a dealership or service garage, or when the vehicle is being driven.

3 Claims, 2 Drawing Sheets

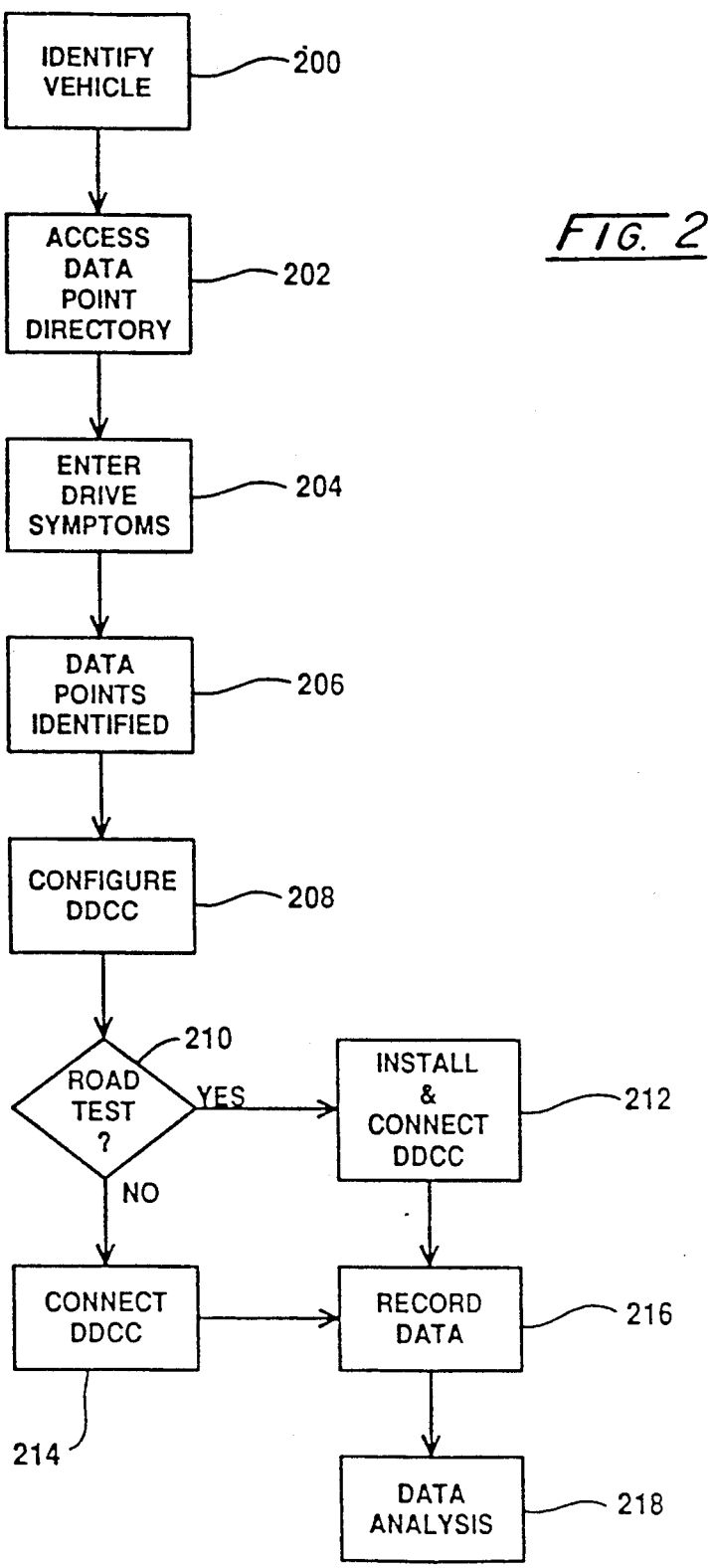

METHOD AND APPARATUS FOR DIAGNOSING ENGINE AND/OR VEHICLE SYSTEM FAULTS BASED ON VEHICLE OPERATING OR DRIVE SYMPTOMS

This application is a continuation of application Ser. No. 07/711,843, filed on Jun. 7, 1991, now abandoned.

BACKGROUND OF THE INVENTION

The present invention relates generally to engine and vehicle analyzers and, more particularly, to a method and apparatus for diagnosing engine and/or vehicle system faults based on vehicle operating or drive symptoms by identifying specific conductors of an on-board control system connector which need to be monitored to obtain parameter data required to diagnose corresponding system failures.

Engine and vehicle analyzers have been around in various forms for some time. The recent extensive incorporation of computer control, sensors and other electronic and electrical components into motor vehicles to control engines and other vehicle operating systems has forever changed vehicle servicing. While engine and/or vehicle analyzers used to be optional or convenient for motor vehicle servicing, they now are a virtual necessity for assisting a mechanic in analyzing vehicle operating problems.

The inability to perform comprehensive diagnostic testing of systems including such components in the field can result in great inefficiencies and expenses. For example, it is often difficult to determine whether an operating problem resides in a vehicle's engine or transmission. As a result, the majority of transmissions which are removed and returned to the factory for repair turn out to be fault free. In most of the remainder of the returned transmissions, the problem can be corrected by a minor adjustment at the factory which easily could have been made in the field had the proper diagnosis been made.

A complicating factor in diagnostic testing is the proliferation of many different computer and/or electronically controlled systems. Differences can be substantial for different makes of cars, for different models from the same manufacturer, and even the same model line from year-to-year. The different systems are generally accompanied by different interfaces and data formats that limit any particular testing unit to only a relatively small number of vehicles. Stocking a large number of different monitors to accommodate the various makes and models is expensive, inefficient and wasteful. However, it is oftentimes difficult if not impossible to perform adequate field service without the use of these analyzers as previously noted.

Another problem is the difficulty of simulating normal driving conditions within the confines of an automotive repair facility, while at the same time monitoring the various systems to determine the location and nature of any malfunctions. Also, some automotive problems are intermittent and do not show up in a single test run. Such intermittent problems require the monitoring of a vehicle's performance over a sufficient, possibly long, period of time such that data representative of a failing or faulty component can be collected when an intermittent malfunction does occur to enable effective diagnostic analysis. Unfortunately, adding to all these problems is the fact that the collection of significant data relies upon the ability of the technician making the analysis. Accordingly, appropriate data may not be collected for hard faults much less intermittent faults.

It is thus apparent that there is a continuing need for improved diagnostic methods and apparatuses which can be used to diagnose motor vehicle system problems. For simplicity sake, the diagnosis preferably would be based on vehicle operating or drive symptoms which can be readily identified by an operator of a motor vehicle or by service personnel.

SUMMARY OF THE INVENTION

The present invention satisfies this need by providing an improved method and apparatus for the collection of vehicle operating data in a motor vehicle diagnosis or analysis system. A new approach is taken in the present invention by utilizing one or more motor vehicle operating or drive symptoms to access a database which identifies the most appropriate cause parameters for the drive symptom or symptoms. The database correlates entered operating or drive symptoms with system problems and, more particularly, with specific system parameters which can be monitored by connection to corresponding vehicle operating data access points. In this way, the present invention overcomes the problem of having a technician select which parameters to monitor either on his or her own or by referring to potentially massive manuals.

Thus, instead of merely monitoring information manually selected by a technician, the present invention provides a drive symptom diagnostic method and apparatus to identify appropriate vehicle operating data access points to monitor, such as conductors or pins of a connector associated with an identified motor vehicle which is experiencing problems. Once the appropriate access points are identified, the present invention will preferably collect pertinent vehicle operating data either when an automobile is being serviced, as at a dealership or service garage, or when the vehicle is being driven. Provided appropriate data is available at such a vehicle system connector or otherwise, an analysis system using the present invention can be used to service a substantially greater number of vehicles once corresponding connection and identification data is provided to the analysis system.

In accordance with one aspect of the present invention, a diagnostic system for the analysis of motor vehicle operating problems comprises memory means for storing data representative of motor vehicles to be serviced using the system, the data including information identifying access points for obtaining vehicle operating data representative of the operation of systems within the motor vehicles. Computer means is provided for accessing the memory means in response to vehicle identification data and motor vehicle driveability symptoms indicative of operating problems to retrieve appropriate information identifying access points to be monitored for collecting vehicle operating data for analysis of systems responsible for the vehicle driveability symptoms.

The diagnostic system preferably further comprises diagnostic data collection means configurable by the computer means for collecting vehicle operating data from the appropriate access points. For analysis of the vehicle operating data, the diagnostic system may further comprise data analysis means responsive to vehicle operating data collected by the diagnostic data collection means for identifying one or more faults of one or more systems responsible for the vehicle driveability symptoms. Preferably, the diagnostic data collection means is portable and can be mounted to a motor vehicle having intermittent operating problems such that diagnostic vehicle operating data can be collecting during occurrences of the intermittent problems. Typically, the access points correspond to pins of multiple-pin or multipin connectors within motor vehicles to be serviced.

In accordance with another aspect of the invention, a method of operating a diagnostic system for analyzing motor vehicle operating problems comprises the steps of: storing data representative of motor vehicles to be serviced using the system, the data including information identifying access points for obtaining vehicle operating data representative of the operation of systems within the motor vehicles; and, accessing the stored data in response to vehicle identification data and motor vehicle driveability symptoms indicative of the operating problems to retrieve appropriate information identifying access points to be monitored for collecting vehicle operating data for analysis of systems responsible for the vehicle driveability symptoms.

The method may further comprise the steps of: monitoring the appropriate access points; and, collecting vehicle operating data from the appropriate access points for analysis of systems responsible for the vehicle driveability symptoms. As an ultimate step, the method may further comprise the step of analyzing collected vehicle operating data for identifying one or more faults within one or more systems responsible for the vehicle driveability symptoms. The analysis may be concurrent with vehicle operating data collection or may be performed at a later time, later analysis being more typical for intermittent problems.

It is thus a feature of the present invention to provide an improved method and apparatus for vehicle operating data collection in a motor vehicle diagnosis or analysis system; to provide an improved method and apparatus for vehicle operating data collection in a motor vehicle diagnosis or analysis system wherein driveability symptoms define which data access points will be monitored in a motor vehicle; and, to provide an improved method and apparatus for vehicle operating data collection in a motor vehicle diagnosis or analysis system wherein driveability symptoms define which data access points will be monitored in a motor vehicle, the data access points corresponding to and being selected from a plurality of conductors or pins within a system connector.

Other features and advantages of the invention will be apparent from the following description, the accompanying drawings and the appended claims.

BRIEF DESCRIPTION OF THE DRAWINGS

FIG. 2 is a flow chart showing operation of a diagnostic system in accordance with the present invention.

DETAILED DESCRIPTION OF THE INVENTION

Figure 1:
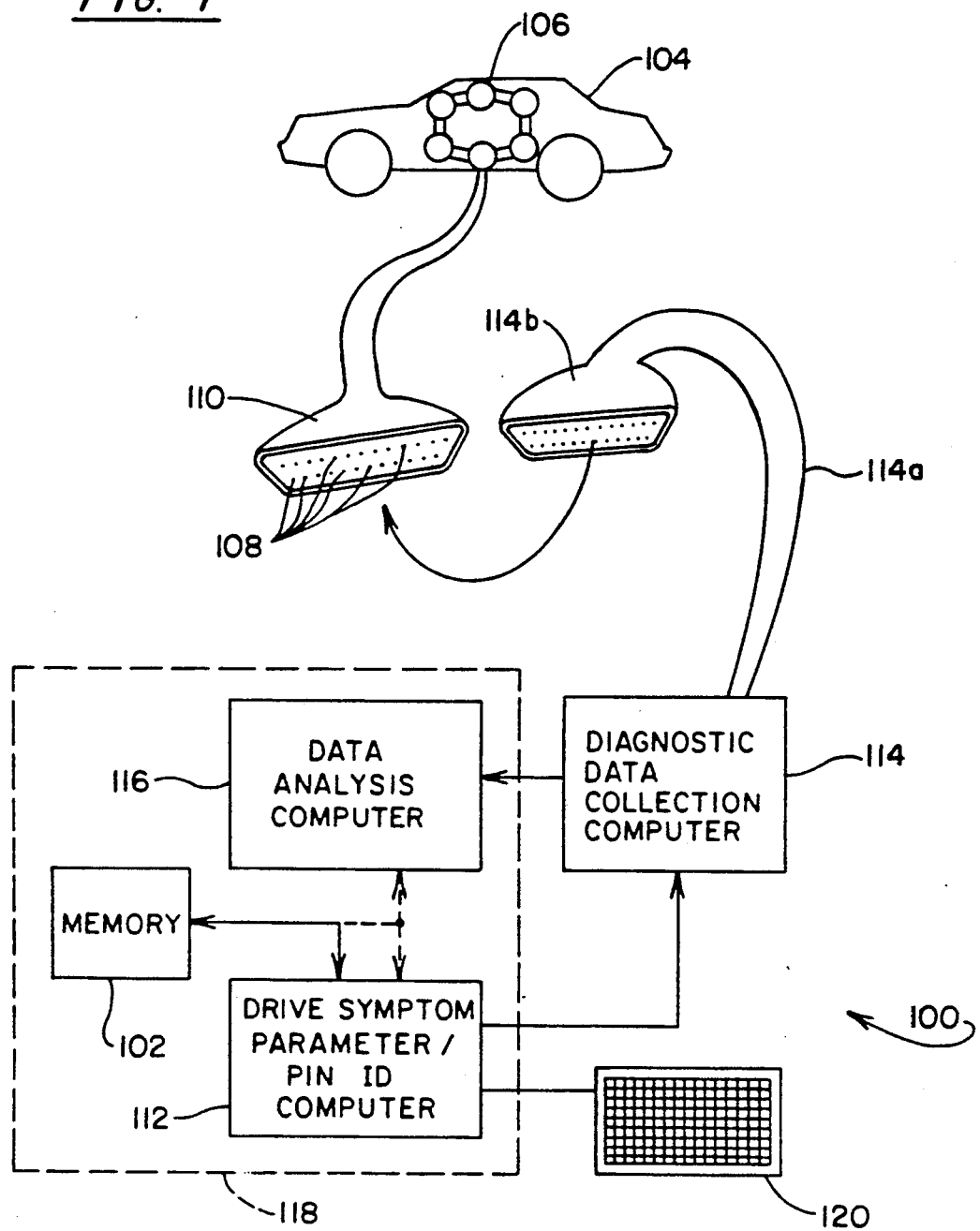
FIG. 1 is a schematic block diagram of an engine/vehicle diagnostic system including the present invention.

The present invention provides a method and apparatus for the collection of vehicle operating data for diagnosis of the causes of problems within motor vehicle engine and/or other operating systems. The present invention takes a new approach to resolving drive concerns by accessing a data base by means of vehicle identity and one or more driveability symptoms to retrieve information identifying the most appropriate cause parameters to monitor for accurate diagnosis of the problems leading to the driveability symptoms. The data base thus yields vehicle operating data access points to be monitored, which data access points typically correspond to conductors or pins of an access connector provided within the vehicle. For example, a sixty (60) pin D-shaped connector is used in many popular motor vehicles for such access; however, any connector configuration can be used in the present invention. In any event, access points based on driveability symptoms are identified for the collection of vehicle operating data necessary for symptomatically analyzing a vehicle problem.

Reference will now be made to FIG. 1 which illustrates in schematic block diagram form a diagnostic system 100 operable in accordance with the present invention. The system 100 includes memory means, taking the form of a computer memory 102 in the illustrated embodiment, for storing data representative of motor vehicles to be serviced using the system 100, for example motor vehicle 104. Data stored in the memory 102 includes both motor vehicle identifying data and data identifying access points for obtaining vehicle operating data representative of the operation of systems within the motor vehicles. A variety of operating systems 106 are represented by the network configuration within the vehicle 104. Typical operating systems within the vehicle 104 include the vehicle engine control system, antilock braking system, suspension system, transmission control system and the like.

The access points into the operating systems 106 typically take the form of conductors or pins 108 of a connector 110 which is included within the vehicle 104. The connector 110 is illustrated as a D-shaped connector which is provided on many popular motor vehicles, for example a sixty (60) pin D-shaped connector may be used.

Computer means taking the form of a drive symptom parameter/pin identification computer 112 is provided for accessing the memory 102 in response to vehicle identification data and motor vehicle driveability symptoms indicative of operating problems being experienced by the operator of the motor vehicle 104. The computer 112 accesses the memory 102 to retrieve appropriate vehicle operating data access points, such as appropriate ones of the conductors or pins 108 of the connector 110, to be monitored for collecting data for analysis of the operating systems 106 most likely responsible for the driveability symptoms displayed by the motor vehicle 104.

The identity of the appropriate data access points is down-loaded to diagnostic data collection means comprising a diagnostic data collection computer 114 (DDCC) in the illustrated embodiment. The diagnostic data collection computer 114 is thus configurable by the drive symptom parameter/pin identification computer 112 for collecting data from the appropriate access points. The diagnostic data collection computer 114 is connected to the operating systems 106 via a cable 114a and an appropriate connector 114b which intermates with the connector 110 thus providing access to the conductors or pins 108 thereof. It should be apparent that a single universal connector such as a sixty (60) pin D-shaped connector would preferably be provided on all motor vehicles; however, a variety of connectors can be interchangeably connected to the diagnostic data collection computer 114 for a corresponding variety of motor vehicle connectors.

The system 100 further preferably comprises data analysis means comprising a data analysis computer 116 in the illustrative embodiment. The data analysis computer 116 is responsive to data collected by the diagnostic data collection computer 114 for identifying one or more faults of one or more systems responsible for the vehicle 104 driveability symptoms.

The data analysis computer 116 may advantageously directly or indirectly access the memory 102 or exchange information with the drive symptom parameter/pin identification computer 112. Due to the highly interrelated nature of the memory 102, the drive symptom parameter/pin identification computer 112 and the data analysis computer 116 they may be combined into a single unit 118 as indicated by the dotted line box in FIG. 1. While the same may be said for the diagnostic data collection computer 114, it is advantageous to have it separate or separable from the remainder of the system 100 such that it can be mounted onto the motor vehicle 104 for road test purposes.

Such on-board testing of the motor vehicle 104 is particularly advantageous for the diagnosis of intermittent faults. For example, the diagnostic data collection computer 114 can be programmed to continually monitor data occurring on the access points or pins 108 which were selected by and down loaded from the drive symptom parameter/pin identification computer 112. In the event of a fault indication in the monitored data, the diagnostic data collection computer then retains a portion of data preceding the fault indication and a portion of data following the fault with this data from the fault window effectively being used for diagnosis of the intermittent fault.

Reference will now be made to FIG. 2 which is a flow chart showing operation of the diagnostic system 100 in accordance with the present invention. The system 100 is initialized by entering the identification of a motor vehicle to be serviced, such as the motor vehicle 104 of FIG. 1, see block 200. Information is entered into the system 100 via a keyboard 120 or other input device. The identification may include make, model, year, serial number and the like. It is contemplated that the data stored in the memory 102 is updated on a routine basis such that problems which may arise in a given series of motor vehicles can be included even to the point of being located within a given series of serial numbers.

The entered vehicle identification is used to access a data point directory, see block 202. The relevant data for the identified motor vehicle may be read out of the memory 102 into the drive symptom parameter/pin identification computer 112 or a given block or blocks of data may be flagged for use by the computer 112. In any event, the appropriate data, if stored in the memory 102, is made available to the computer 112.

Next, the driveability or drive symptoms are entered into the system via the keyboard 120 or other appropriate input device, see block 204. It is contemplated that a menu of predefined drive symptoms will be provided for the system 100 such that a cursor or other pointing device may be used to select the appropriate symptom or symptoms from the menu. However, symptoms may be entered in any other appropriate manner such as by keyboard as noted, by precoded identification card or otherwise.

The system 100 will then be able to identify the appropriate data access points, for example pins 108 of a connector 110 which are to be monitored, to collect data for accurately and expeditiously diagnosing the problem or problems which resulted in the drive symptom complained of by the operator of the motor vehicle, see block 206. This data is down-loaded to the diagnostic data collection computer 114 wherein it is used for configuration purposes such that only identified ones of the signals received over the cable 114a and associated connector 114b are collected by the diagnostic data collection computer 114, see block 208.

If the system 100 is to be used for a road test, for example to diagnose an intermittent fault which cannot be duplicated while the vehicle is at the service facility, the diagnostic data collection computer 114 is installed and connected into the motor vehicle being serviced, see blocks 210 and 212. If the system 100 is to be used at the service facility, the diagnostic data collection computer 114 is more simply connected to the motor vehicle to be serviced for example by the cable 114a without installation and possible separation of the diagnostic data collection computer 114 from the remainder of the system, see blocks 210 and 214. In any event, the motor vehicle is operated and data appropriate for the diagnosis of operating system problems is collected by the diagnostic data collection computer 114, see block 216.

The data collected in the diagnostic data collection computer 114 is finally analyzed to determine faults within the operating systems of the motor vehicle 104 such that the faults can be quickly corrected at the least expense to the owner of the motor vehicle, see block 218. For analysis at the service facility, the data may be concurrently analyzed as it is collected. Analysis of data collected during a road test will of course be performed once the diagnostic data collection computer 114 is returned to the service facility and can be reunited with the data analysis computer 116.

While the operating method of the present invention should be apparent from the foregoing description, it will now be described to ensure clarification of the invention. A method of operating a diagnostic system for analyzing motor vehicle operating problems in accordance with the present invention comprises the steps of: storing data representative of motor vehicles to be serviced using the system, the data including the identification of access points for obtaining data representative of the operation of systems within the motor vehicles; and, accessing stored data in response to vehicle identification data and motor vehicle driveability symptoms indicative of the operating problems to retrieve appropriate access points to be monitored for collecting data for analysis of systems responsible for the vehicle driveability symptoms. The method preferably further comprises the steps of: monitoring the appropriate access points; and, collecting data from the appropriate access points for analysis of systems responsible for the vehicle driveability symptoms. For total analysis, the method may further comprise the step of analyzing collected data for identifying one or more faults within one or more systems responsible for the vehicle driveability symptoms.

Having thus described the present invention in detail and by reference to preferred embodiments thereof, it will be apparent that modifications and variations are possible without departing from the scope of the invention defined in the appended claims.

What is claimed is:

1. A diagnostic system for the analysis of motor vehicle operating problems, said system comprising:

a memory for storing data representative of a plurality of motor vehicles to be serviced using said system, said data including a data point directory containing information identifying data access points for obtaining vehicle operating data representative of the operation of a plurality of systems within each of said plurality of motor vehicles, said data access points corresponding to pins of multipin connectors within motor vehicles to be serviced;

a drive symptom parameter/pin identification computer for accessing said data point directory stored in said memory in response to motor vehicle identification data to retrieve relevant data identifying pins of a multipin connector for the identified motor vehicle through which specific data for the identified motor vehicle can be retrieved, said drive symptom parameter/pin identification computer further accessing said retrieved relevant data for the identified motor vehicle in response to motor vehicle driveability symptoms indicative of said operating problems to retrieve vehicle specific information identifying appropriate ones of said pins of said multipin connector for the identified motor vehicle to be monitored for collecting vehicle operating data for analysis of one or more systems most likely responsible for said vehicle driveability symptoms;

a diagnostic data collection computer responsive to said vehicle specific information for collecting data only from pins of said multipin connector for the identified motor vehicle; and a data analysis computer responsive to the data collected by said diagnostic data collection computer for identifying one or more faults of one or more of said plurality of systems of the motor vehicle identified by said motor vehicle identification data.

2. A diagnostic system for the analysis of motor vehicle operating problems as claimed in claim 1 wherein said diagnostic data collection computer is portable and can be mounted to a motor vehicle having intermittent operating problems such that diagnostic vehicle operating data can be collected during occurrence of the intermittent problems.

3. A method of operating a diagnostic system for analyzing motor vehicle operating problems, such method comprising the steps of:

storing data representative of a plurality of motor vehicles to be serviced using said system, said stored data including a data point directory containing information identifying data access points for obtaining vehicle operating data representative of the operation of a plurality of systems within said plurality of motor vehicles, said data access points corresponding to pins of multipin connectors within motor vehicles to be serviced;

accessing said data point directory of said stored data in response to vehicle identification data to retrieve relevant data identifying pins of a multipin connector for the identified motor vehicle through which specific data for the identified motor vehicle can be retrieved;

accessing said retrieved relevant data for the identified motor vehicle in response to motor vehicle driveability symptoms indicative of said operating problems to retrieve vehicle specific information identifying appropriate ones of said pins of said multipin connector for the identified motor vehicle to be monitored for collecting vehicle operating data for analysis of one or more systems most likely responsible for said vehicle driveability symptoms;

monitoring said appropriate ones of said pins of said multipin connector for the identified motor vehicle;

collecting vehicle operating data from said appropriate ones of said pins of said multipin connector for the identified motor vehicle for analysis of one or more systems most likely responsible for said vehicle driveability symptoms; and analyzing collected vehicle operating data for identifying one or more faults within one or more systems responsible for said vehicle driveability symptoms.

* * * * *